Figure 1:
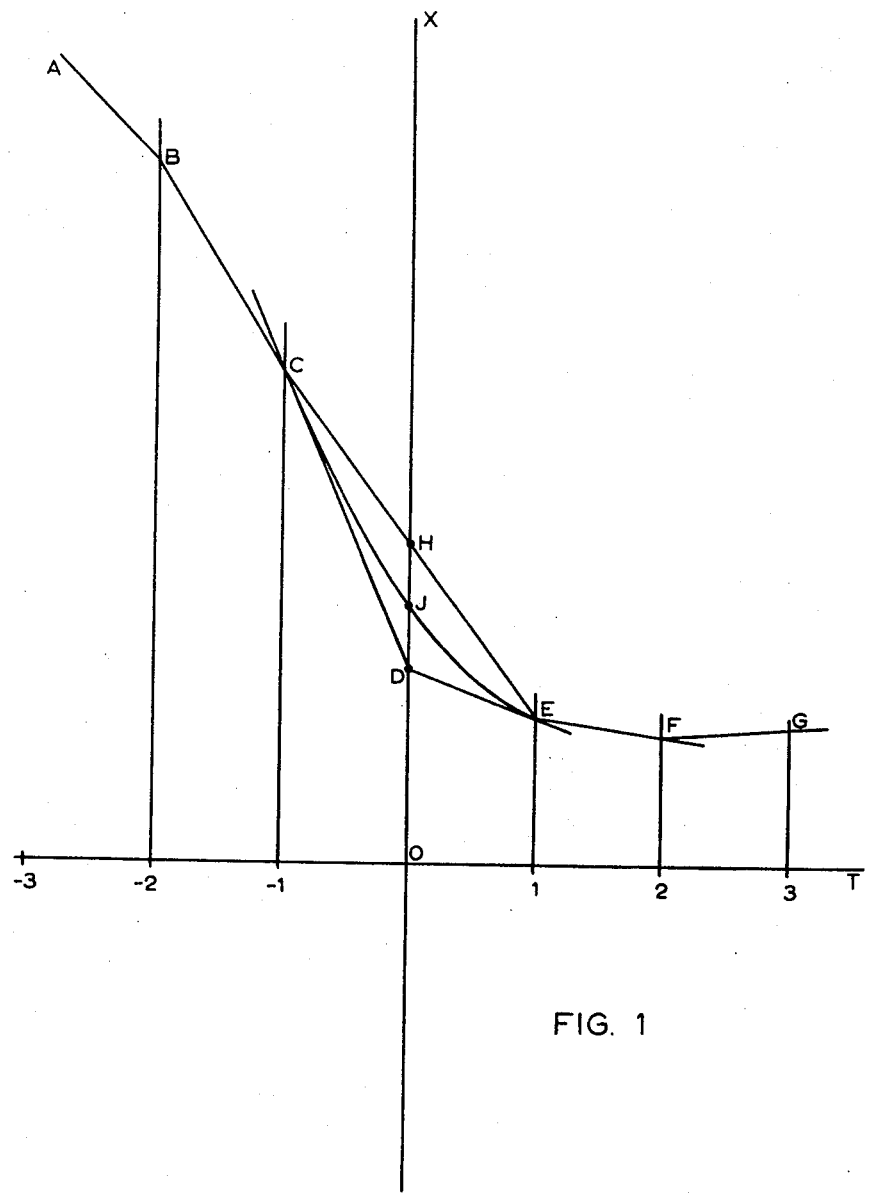

United States Patent Office 3,178,563
Patented Apr. 13, 1965

3,178,563
INTERPOLATING ARRANGEMENTS ESPECIALLY FOR THE AUTOMATIC CONTROL OF MACHINE TOOLS
David Dean Wedgwood, Twickenham, and Frederick Walter Hartley, Hayes, England, assignors to Electric & Musical Industries Limited, Hayes, England, a company of Great Britain
Filed Apr. 11, 1961, Ser. No. 102,154
Claims priority, application Great Britain, Apr. 13, 1960, 13,111/60
10 Claims. (Cl. 235—151)

This invention relates to interpolating arrangements especially for the automatic control of machine tools.

In the specification of United States Patent No. 2,929,555, there is described an interpolating device, especially for an automatic control mechanism for a machine tool, comprising means for deriving first input signals representing values of a first co-ordinate of successive reference points defining a locus, means for deriving second input signals representing values of a second co-ordinate of successive reference points defining said locus, first interpolating means responsive to said first input signals for generating first output signals representing intermediate values of said first co-ordinate, second interpolating means for generating second output signals representing intermediate values of said second co-ordinate, said first and second interpolating means being arranged to generate the respective output signals as curvilinear functions of a common nongeometric parameter.

Each interpolating means usually comprises a combination of transformers for generating interpolated signals representing spaced points lying on a quadratic curve in response to signals representing three reference points of the curve, and an autotransformer producing signals representing closer points lying on a straight line joining adjacent spaced points represented by said interpolated signals. Each group of three reference points of the curve defines a span of the curve and successive spans have a common reference point.

When such an interpolating device is used to control the relative positions of a tool holder and a work carrier so that a desired outline or surface may be cut on a workpiece, it is probable that the interpolating device will need to operate over several spans one after the other to cause the desired locus to be cut. A span is the range of the interpolating device which can be achieved without switching the input signals, and usually is the section of the locus lying between the reference points represented by the input signals.

In order to obtain high accuracy in the complicated portions of the locus it is necessary to use a relatively short span length, whereas in the interests of efficiency it is desirable to use a relatively long span length on less complicated portions of the locus so as to achieve the required accuracy of the finished product, without having to programme many more reference points than necessary. However, if the cutting speed is to be maintained at a constant or substantially constant value as would be essential if a flame cutter is used this involves altering the rate of change of the interpolator parameter. Moreover when changing from a long span to a short one, or vice versa, the rate of change of the interpolator parameter is required to change instantaneously from the first rate to the second at the junction point, in order to maintain the cutting speed at a constant value. Since this is not possible because of the inertia of the switches, motor and tachogenerator on the interpolator parameter shaft, it is likely that there will be a jerk in the movement of the cutter relative to the workpiece on the machine tool, possibly causing damage to the workpiece.

It is the object of the present invention to provide an arrangement whereby this disadvantage is overcome and the need for instantaneous changes in the rate of change of the interpolator is removed.

According to the present invention, an interpolating arrangement comprises two interpolating means having terminals for input signals so arranged that sets of input signals can be applied alternately to said means and having a selector movable to derive an output signal alternately from said means in such a way that the output signal varies to represent interpolated values of functions defined by the sets of input signals and by the interpolating means, and wherein means are provided to cause the output signal to vary smoothly from a value of the function interpolated by one interpolating means, to a value of the function interpolated by the other interpolating means whilst the selector moves through a range of positions which includes the change over from one interpolating means to the other but is small compared with the total range of positions of the selector.

According to a preferred form of the present invention there is provided an interpolating arrangement comprising first means for generating signals representing values of a co-ordinate at a first set of successive spaced points of a first locus terminating at a junction point, second means for generating signals representing values of said co-ordinate at a second set of successive spaced points of said first locus beginning at said junction point, selector means for selecting signals from said first means at a first rate, and from said second means at a second rate, wherein means are provided for describing a second locus connecting a point of said first set with a point of said second set, tangential to said first locus at said two points, at a smoothly varying or constant rate, so that there are no discontinuities in the velocities at said two points.

Figure 2:
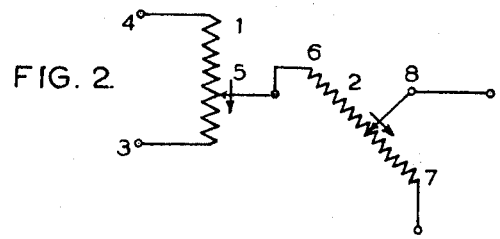
Figure 3:
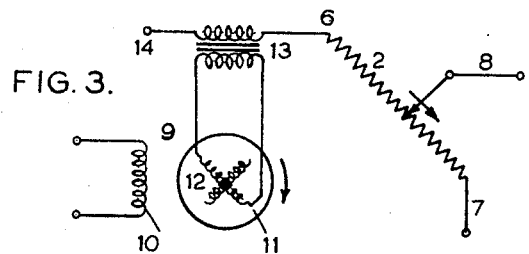
Figure 5:
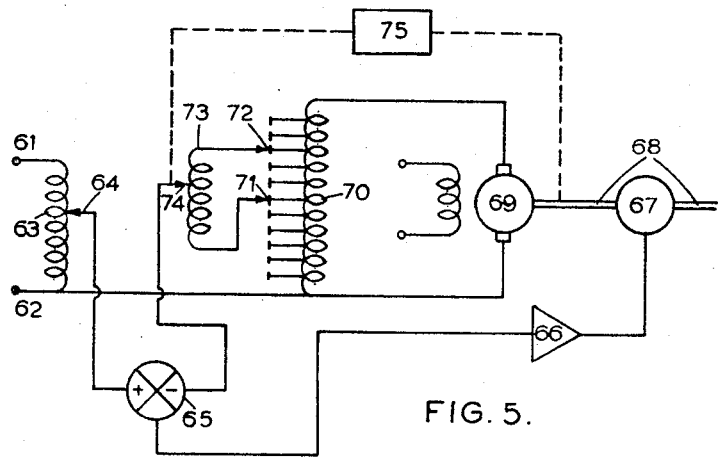
Figure 4:
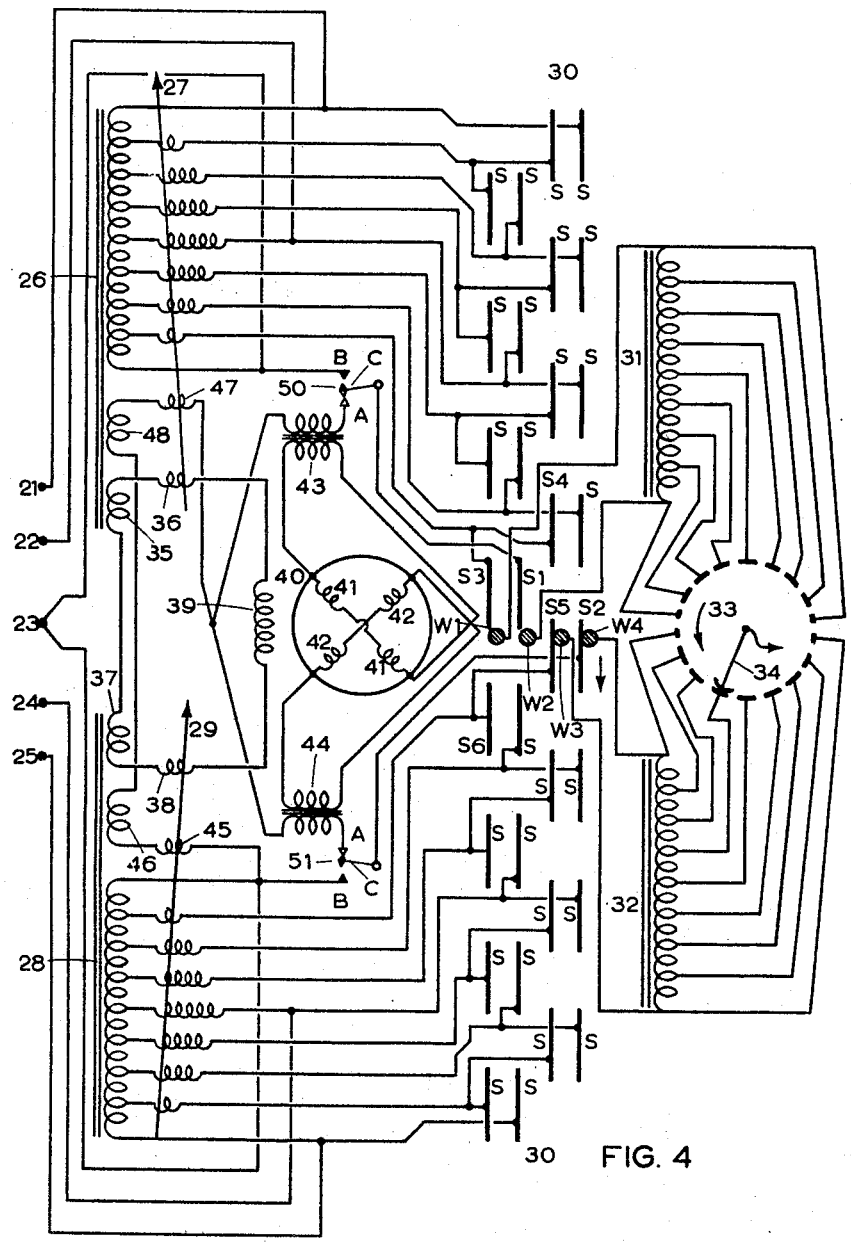
Figure 6:
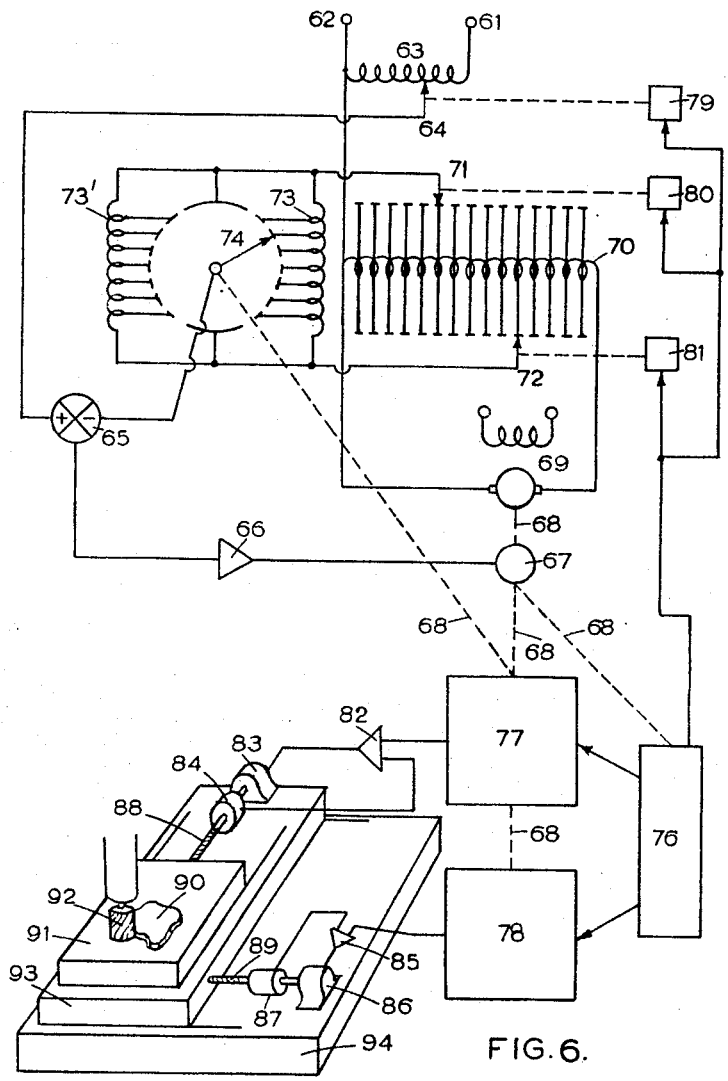

In order that the invention may be fully understood and readily carried into effect, it will now be described in greater detail with reference to the accompanying drawings, in which:

FIGURE 1 is a graph explanatory of the operation of an arrangement according to one example of the present invention, FIGURES 2 and 3 are circuit diagrams illustrating the principle of part of the said arrangement according to an example of the invention, FIGURE 4 is a diagram of the said arrangement in accordance with one example of the present invention, FIGURE 5 is the circuit diagram of a speed control unit for an interpolating arrangement such as that shown in FIGURE 4, and FIGURE 6 is a diagram of a machine tool fitted with an automatic control system using an interpolator according to the present invention.

Referring to FIGURE 1, the ordinate of the graph is one co-ordinate of the locus which the mechanism is required to generate. Let the co-ordinate be $x$. The abscissa of the graph represents the parameter T of the interpolator with respect to which the interpolation is performed. The interpolator may be of the type described in the above mentioned specification.

The graph shows the junction between two spans at the point D, the last part of the first span being represented by the line ABCD and the first part of the second span by the line DEFG. The parameter T changes by one unit for each sub-span such as AB. The points A, B, C, D, E, F and G represent output voltages of interpolators A, B, C and D from one interpolator and D, E, F and G from another.

At the point D it is evident from the drawing that the rate of change of $x$ with respect to T changes by a considerable amount, as is indicated by the angle between lines C, D and D, E. In order to avoid a large change in $$\frac{dx}{dt}$$

the rate of change of $x$ with respect to time, at the point D where $$\frac{dx}{dT}$$

changes from a large value to a small one, the interpolator speed $$\frac{dT}{dt}$$

must change from a small value to a large one so that the product $$\frac{dx}{dT} \cdot \frac{dT}{dt}$$

remains more constant.

If $$\frac{dx}{dT}$$

is arranged to change parabolically over the last sub-span of the first and the first sub-span of the second span, that is along the path CJE, only a relatively gradual acceleration of interpolator speed $$\frac{dT}{dt}$$

is needed to give a constant value of $$\frac{dx}{dt}$$

The axis of the parabola is parallel to OX and therefore if the change in the value of x between D and H is $$\frac{p}{2}$$

then the change in the value of $x$ between D and J is $$\frac{p}{4}$$

The value of $p$ is

DC (resolved along OX)—ED (resolved along OX) taking the sign into consideration.

It may be shown that the equation of the parabola section CJ is $$x = \left[d + \frac{p}{4}(1+T)\right](1+T) - C.T$$

if C is the point $(-1, c)$, D is the point $(0, d)$ and T varies between $-1$ and $0$. Similarly the equation of the parabola section JE is $$x = \left[d + \frac{p}{4}(1-T)\right](1-T) + e.T$$

If E is the point $(1, e)$ and T varies between 0 and $+1$.

These equations may be generated by means of very simple apparatus such as that shown in FIGURES 2 and 3.

Referring now to FIGURE 2, the apparatus consists of two potentiometers 1 and 2 with their wipers ganged together. The potentiometer 1 has two terminals 3 and 4 and wiper 5, to the terminal 3 is applied a voltage proportional to $d$. To the terminal 4 is applied a voltage proportional to $$d + \frac{p}{4}$$

The potentiometer 2 has two terminals 6 and 7 and a wiper 8. The wiper 5 of the potentiometer 1 is connected to terminal 6. To the terminal 7 of the potentiometer 2 is applied a voltage proportional to $c$. The output voltage is obtained from the wiper 8. The potentiometers are ganged so that when the wiper 5 is at terminal 4 the wiper 8 is at terminal 6. If the wiper 5 is a fraction $\theta$ of the distance from 3 to 4 then the voltage obtained at the wiper 8 is $$\left(d + \theta, \frac{p}{4}\right) \cdot \theta + C(1-\theta)$$

which is the same as the expression for $x$ in the equation of the section CJ of the parabola if $\theta = 1+T$. In describing the section CJ the wiper 5 moves from 3 to 4 and the wiper 8 moves from 7 to 6. In describing the section JE the wiper 5 moves from 4 to 3 and the wiper 8 moves from 6 to 7.

In the arrangement shown in FIGURE 3, the potentiometer 1 is replaced by a variable linkage transformer 9 comprising a stator winding 10 energised by a source of alternating voltages proportional to $$\frac{p}{8}$$

a rotor carrying two windings 11 and 12, of which the winding 11 is connected to the primary winding of a transformer 13, the rotor being geared to the potentiometer 2 so that for the whole sweep of the potentiometer the rotor performs a 90° rotation. The secondary winding of the transformer 13 is connected between the terminal 6 and a source 14 of alternating voltage proportional to $$d + \frac{p}{8}$$

The variable linkage transformer 9, which may be of the kind described in the specification of United States Patent No. 2,882,483 supplies a voltage across the primary winding of transformer 13 which varies as a linear function of the angle of the rotor between $$\frac{-p}{8}$$

and $$\frac{+p}{8}$$

for a range of 90° of rotor angle. The turns ratio of transformer 13 is 1:1. Clearly, this circuit arrangement operates in a similar manner to that of FIGURE 2.

The arrangement shown in FIGURE 4 comprises an interpolating device of the kind described in the specification of United States Patent No. 2,929,555 modified in accordance with the present invention. Referring now to FIGURE 4 in conjunction with FIGURE 1, alternating voltages from five stores, which may be of the type described in the specification of United States patent application Serial No. 620,145, now U.S. Patent No. 3,136,145 representing values of one co-ordinate of five points of a locus, are applied to the five terminals 21, 22, 23, 24 and 25. The terminals 21, 22 and 23 are associated with the reference points of a first span of the locus and the terminals 23, 24 and 25 with reference points of a second span adjacent to the first, the two spans meeting at the span change point associated with terminal 23. In FIGURE 1 the points A, B, C, D define the ends of sub-spans of the first span, and the points D, E, F, G define the ends of sub-spans of the second span, the point D being the span-change point.

The terminals 21, 22 and 23 are connected to the input points of an interpolator of the type described in the specification of United States Patent No. 2,928,604, comprising an autotransformer 26 having a number of equally spaced tappings, from which the output signals are obtained via the quadratically related windings of a second transformer whose inductive coupling is indicated by the arrow 27. The terminals 23, 24 and 25 are connected to a second interpolator of the same type comprising an autotransformer 28 and a further transformer whose coupling is indicated by the arrow 29.

The output signals of these interpolators are supplied to the studs S of a rotary switch 30 having wipers W1, W2, W3 and W4. The switch 30 is shown in opened out form for ease of illustration but it will be appreciated that the studs S shown are in fact arranged in co-axial rings, so that the wipers W may scan the studs S cyclically.

The wipers W1 and W2 are connected to the end terminals of an autotransformer 31. The wipers W3 and W4 are connected to the end terminals of an autotransformer 32. Both autotransformers 31 and 32 are tapped at equally spaced intervals and the tappings together with the end terminals are connected to the studs of a rotary switch 33 having a wiper 34. The end connections of the autotransformers are connected to studs which are half the length of those connected to intermediate tappings, because when the wiper 34 passes from studs connected to one autotransformer to studs connected to the other, the end terminals connected to the wiper 34 as it passes will be at the same voltage. Alternatively, one end terminal of each of 31 and 32 may be left unconnected to the switch 33, the other terminal of each being connected to a stud of the switch 33 of the same length as those to which the intermediate tappings are connected. The operation of these two autotransformers which together form what is termed a linear sub-interpolator is fully described in the specification of United States patent application No. 484,604, now U.S. Patent No. 2,858,996.

The switches 30 and 33 have their wipers W1, W2, W3 and W4, and 34 geared together so that the wiper 34 performs half a revolution as the wipers W1, W2, W3 and W4 move the distance from the centre of one pair of studs S to the centre of the next pair of studs S, anti-clockwise rotation of 34 corresponding to movement down the page of W1, W2, W3 and W4, and the relative positioning such that W1 and W2 are just about to leave a pair of studs, and W3 and W4 have just reached a pair of studs, as the wiper 34 leaves an end terminal of auto-transformer 31 to join an end terminal of autotransformer 32. With the connections as shown in FIGURE 5 and the gearing as described above, the voltage on the wiper 34 represents one co-ordinate of points on a succession of chords of two quadratic curves through the five points (taken three at a time) of which the one co-ordinate of each is represented by the voltages applied to terminals 21, 22, 23, 24 and 25, the autotransformers 31 and 32 being connected across adjacent output points of the interpolator alternately.

Four windings, 35 coupled to the autotransformer 26, 36 coupled to the transformer indicated by the arrow 27, 37 coupled to the autotransformer 28, and 38 coupled to the transformer indicated by the arrow 29, are connected in series with stator winding 39 of variable linkage transformer 40 so that the voltage developed across the winding 39 if the energisation of the two interpolators is such as to give output voltages corresponding to FIGURE 1 as described above, represents ⅛[(DC resolved along OX)−(ED resolved along OX)]

taking sign into consideration. This quantity was referred to as $$\frac{p}{8}$$

in the description of FIGURE 1.

The rotor winding 41 of the variable linkage transformer 40 is connected to the primary winding of the transformer 43. The rotor winding 42 of 40 is connected to the primary winding of the transformer 44. One terminal of each of the secondary windings of transformers 43 and 44 is connected via winding 45 coupled to 29, winding 46 coupled to 28, winding 47 coupled to 27, and winding 48 coupled to 26, to the terminal 23. The windings 45, 46, 47 and 48 have the same numbers of turns as windings 38, 37, 35 and 36 respectively, so that one voltage applied to the common connection of the secondaries (transformers 43 and 44) represents $$d+\frac{p}{8}$$

The terminal of the secondary winding of transformer 43, not connected to the transformer 44, is connected to contact 50A of switch 50. The contact 50B is connected to terminal 23, and the contact 50C is connected to stud S1 of switch 30. The terminal of the secondary winding of the transformer 44, not connected to transformer 43, is connected to contact 51A of switch 51. The contact 51B is connected to terminal 23 and the contact 51C is connected to the stud S2 of the switch 30.

The switches 50 and 51 are ganged together and may, for example be operated by the same relay mechanism, so that for normal operation of the interpolators the contacts A and C of both switches are joined but when it is required to cut a sharp corner, or for some other reason, it is desired not to utilise the present invention, the relay is energised in response to a signal coded on the instruction tape, causing the contacts B and C of both switches to be joined.

When the contacts B and C of the switches 50 and 51 are joined the operation is similar to that described in the specification of United States Patent No. 2,929,555.

However, when the switches 50 and 51 are in the position shown in the drawing the operation of the circuit is similar to that of the circuit shown in FIGURE 3. The variable linkage transformer 40 is geared to the switches 30 and 33 so that it performs one revolution for every two of the switch 33. Suppose that the wipers W1, W2, W3 and W4 of the switch 30, which, of course, move in unison, are positioned so that W1 contacts S3, W2 contacts S1 and W3 contacts S4. In this position the wiper 34 will be placed to contact the upper end of transformer 31 or the lower end of transformer 32. Therefore the wiper 34 has a voltage proportional to "c" applied to it via the studs S3 and S4. As wiper 34 rotates in an anticlockwise direction the wipers W1, W2, W3 and W4 move towards the bottom of the page so that the voltage on the wiper 34 corresponds to successive points of the curve CJ, the point J being reached when W1 contacts S3, W2 contacts S1, W3 contacts S5, W4 contacts S2, and 34 is connected to W4 via the appropriate contact of switch 33. During the next half revolution of the wiper 34, its voltage corresponds to points of the curve J. During the description of the curve CJ the transformers 31, 40 and 43 correspond to components 2, 9 and 13 respectively of FIGURE 3 and are connected in the same way. Similarly, during the description of the curve JE, the transformers 32, 40 and 44 correspond to components 2, 9 and 13 respectively of FIGURE 3. The curves CJ and JE are in fact sections of the same parabola. It is important that the rotor of the variable linkage transformer 40 is phased correctly with respect to switches 30 and 33.

Since CJ is tangential to CD at C and JE is tangential to DE at E, it is clear that if there is no sudden change in $$\frac{dT}{dt}$$

at C or E then there will be no sudden jump in $$\frac{dx}{dt}$$

at those points. It is therefore possible by a relatively gradual change in $$\frac{dT}{dt}$$

to maintain a substantially constant cutting speed assuming of course that the generation of the other coordinates is similarly carried out.

It will be appreciated that, in operation, the interpolators are connected to the five stores indicated by the terminals 21, 22, 23, 24 and 25 by switches so that the input voltages to one interpolator represent alternate spans of the locus, the other interpolator receiving inputs representing the remaining spans, and adjacent spans having a common point. Thus, although in the drawing both interpolators are shown connected to the terminal 23 this is a state of affairs which only exists at certain times when the store connected to the point 23 represents a span change point. This principle of leap-frogging and the switch means required to implement it are described in the specification of United States Patent No. 2,929,555.

Since it is probable that it will be required to use the invention at all span change points, it will be necessary to provide further means similar to those described above to carry out the invention at the transition from the second interpolator to the first at the end of the second span, in fact, all that need be duplicated is the windings 45, 46, 47 and 48, the secondary windings of transformers 43 and 44 and the relays 50 and 51. In this case, the circuit will be as shown in the drawing, except that the end of the second series of windings 45 to 48 will be connected to the other end of the autotransformer 28, and the second set of relays 50 and 51 will be connected to the outer end connections of the interpolators as they are shown in FIGURE 4 and to the studs of the switch 30 associated with them. It is important to ensure that the phasing of the variable linkage transformer 40 is correct for both transformers between the interpolators.

The apparatus shown in FIGURE 5 is intended to be used in conjunction with FIGURE 4 to produce the requisite gradual change of $$\frac{dT}{dt}$$

An alternating voltage of reference amplitude is applied via terminals 61 and 62 across the inductive potentiometer 63, which carries a wiper 64. The wiper 64 is connected to one input of a differential circuit 65, of which the output drives the servo motor 67 via the servo amplifier 66. The motor 67 drives the shaft 68 which is coupled to the switches 30 and 33 and the variable linkage transformer 40 of FIGURE 4. Thus the angular velocity of the shaft 68 is $$\frac{dT}{dt}$$

Also coupled to the shaft 68 is a tachometer 69, energised by the source of reference voltage, the output of which is applied across the tapped autotransformer 70. Two wipers 71 and 72 each connected to one end terminal of an inductive potentiometer 73, co-operate with the tappings on the autotransformer 70. The wiper 74 of the inductive potentiometer 73 is connected to a second input of the differential circuit 65. Terminal 62 is connected to one end of the autotransformer 70 so that the two inputs to 65 appear in the correct phase.

In operation, the wiper 64 is set, either manually or in response to a coded signal on the instruction tape, to a position representing the interpolator span which, when taken in conjunction with a standard span length produces the desired cutting speed. The wipers 71 and 72 are set to tappings on the autotransformer 70 proportional to the lengths of the span before and the span after the junction point D respectively, manually or in response to the programme tape. The wiper 74 is coupled to the interpolator shaft 68 by means of the clutch and gearbox 75 and is so arranged that it is connected to the wiper 71 at the point C, that is for $T=-1$, and after scanning the curve CJE as the wiper 74 moves over the winding 73, is connected to the wiper 72 at the point E, for $T=+1$.

The circuit operates as a normal velocity servo mechanism so that when 74 connects with 71 the shaft 68 rotates at a speed proportional to the demanded cutting speed as represented by the position of 64 divided by the span length before the junction point D. With a suitable choice of scales for the cutting speed and the span length the constant of proportionality is one. When 74 is required to move over 73 towards 72 so that the shaft 68 changes speed and keeps the cutting speed constant as the curve CJE is described the clutch 75 is engaged so coupling the wiper 75 to the shaft 68. When 74 reaches 72, at the point E, the clutch 75 is disengaged in response to a signal derived from a switch coupled to the shaft 68 and so causes the new interpolator speed to be maintained until a further change is required.

The wiper 74 is selectively coupled to the interpolator shaft 68 by means of the clutch and gearbox 75 so that it traverses the winding 73 in opposite directions alternately as speed changes are required, the free one of the wipers 71 and 72 being repositioned during the span. In an alternative arrangement, the winding 73 may consist of two sections, both connected between the wipers 71 and 72, so that the wiper 74 traverses them alternately continuously, in response to the rotation of the shaft 68, two relays being provide selectively to connect the differential circuit 65 to one of the wipers 71 or 72 instead of to the wiper 74.

If a change of cutting speed is required for a particularly complicated section, then the wiper 72 may be set to a larger span length value thus increasing the feedback. In this case the cutter will slow down over the section CJE smoothly.

Instead of the arrangement shown in FIGURE 5 any one of the cutting speed control devices described in the specification of United States application Serial No. 724,772 or in the specification of United States application Serial No. 724,771, now abandoned, may be used.

In other embodiments of the present invention the curve CJE may take forms other than a parabola. In these cases the variable linkage transformer would be replaced by a conventional resolver or other non-linear synchro.

FIGURE 6 shows another speed control circuit which may be used in conjunction with interpolating arrangements of the form illustrated in FIGURE 4. Compared with the FIGURE 3 arrangement the winding 73 has been modified by the provision of a further winding 73', the two windings 73 and 73' being connected to studs of a rotary switch, in which two blocks of studs are connected, one to the wiper 71 and the other to the wiper 72, these blocks of studs corresponding to the straight sections C'H' and K'E' of the locus. This arrangement obviates the necessity for the relays to connect the wipers 71 and 72 to the differential circuit 65 as described above. The wiper 74 is geared to rotate with the shaft 68 and scans the contacts continuously, and each of the wipers 71 and 72 is set to its new position whilst the wiper 74 contacts the block of studs connected to the other.

The block 76 represents the programme tape reader and control circuitry for the machine tool. The block 77 represents the interpolator for the x-coordinate direction and consists of the apparatus shown in FIGURE 4 together with the associated stores and switches. The block 78 represents the interpolator for the y-coordinate direction.

The wipers 64, 71 and 72 are positioned in response to signals derived from the programme tape by means of apparatus represented by the blocks 79, 80 and 81.

The mechanical parts of the machine tool are represented in diagrammatic form and show a workpiece 90 mounted on the worktable 91 being cut by the tool 92. The worktable is arranged to move in the x-coordinate direction relative to the tool 92 in response to signals derived from the block 77 which are amplified by the amplifier 82 and control the servo motor 83. The motor 83 rotates a lead screw 88 which positions the worktable in the x direction and also operates the feedback unit 84 which provides the position analogue signal which is compared with the output signal of the block 77 by the amplifier 82. The worktable 91 is mounted on a slide 93 which is positioned in the y-direction by the lead screw 89 which is rotated by the motor 86 in response to the difference between the y-coordinate signal from the block 78 and the position analogue signal from the feedback unit 87, amplified in 85.

What we claim is:

1. An interpolating arrangement comprising two interpolating means having terminals for input signals so arranged that sets of input signals can be applied alternately to said means and output terminals for signals derived from said input signals by said interpolating means, a selector moveable to "connect with said output terminals selectively and derive therefrom" an output signal alternately from said means in such a way that the output signal varies to represent interpolated values of functions defined by the sets of input signals and by the interpolating means, and blending means including means mechanically coupled to said selector means for selectively adding to said output signal a proportion of the difference in signal change between two output terminals of one interpolating means and the signal change between two output terminals of the other interpolating means, said proportion being dependent on the position of said selector means, so as to cause the output signal to vary in accordance with a smooth curve from a value of the function interpolated by one interpolating means to a value of the function interpolated by the other interpolating means whilst the selector moves through a range of positions which includes the changeover from one interpolating means to the other but is small compared with the total range of positions of the selector.

2. An interpolating arrangement comprising first means for generating signals representing values of a co-ordinate at a first set of successive spaced points of a first locus terminating at a junction point, second means for generating signals representing values of said coordinate at a second set of successive spaced points of said first locus beginning at said junction point, selector mean for selecting signals from said first means at a first rate, and from said second means at a second rate, and means mechanically coupled to said selector means for modifying said selected signals by proportions of the difference between the change in signal value from a chosen point of said first set and said junction point and the change in signal value from said junction point and a chosen point of said second set, the proportion depending on the position of said selector means, said means for modifying said selected signals being arranged to describe a second locus connecting said chosen point of said first set with said chosen point of said second set at a smoothly varying or contant rate, so that there are no discontinuities in the rate of change of said co-ordinate value between said two chosen points.

3. An arrangement according to claim 1 further comprising means for causing the rate of movement of said selector to vary smoothly from one value to another whilst the selector is moved through said range of positions.

4. An arrangement according to claim 1 further comprising two further interpolating means similar to said first mentioned two interpolating means and having a selector movable in unison with siad first mentioned selector, said first mentioned two interpolating means and said further two interpolating means being arranged respectively to produce interpolated values of two co-ordinates of successive points on a locus, said values being interpolated as functions of a common parameter, the value of which is represented by the positions of the respective selectors, and wherein the rate of movement of said selectors is caused to vary in such manner as to tend to maintain the rate of description of said locus substantially constant.

5. An interpolating arrangement according to claim 2 wherein said means for modifying said selected signals comprises three input terminals for signal values at said chosen points and said junction point, means connected to a first and a third of said terminals to which the signal values at said chosen points are applied producing a voltage equal to the mean of the signal values on said first and third terminals, first linear interpolating means responsive to the signal value at said junction point applied to said second of said terminals and to said mean signal value, second linear interpolating means responsive to the signal values on said first terminal and a signal value derived from said first linear interpolating means, a third linear interpolating means responsive to the signal value on said third terminal and to a signal value derived from said first linear interpolating means wherein said linear interpolating means are so coupled together that an output signal value derived selectively from said second and third linear interpolating means represents a quadratic function of "the settings of said linear interpolating means."

6. An interpolating arrangement according to claim 5 wherein said output signal value is derived from said second and third linear interpolators alternately.

7. An interpolating arrangement according to claim 6 wherein said second and third linear interpolators are inductive voltage dividers and said first linear interpolator is a variable linkage transformer.

8. An interpolating arrangement according to claim 5, including means for selectively disabling said first linear interpolating means and connecting said secod and third linear interpolating means to said second terminal.

9. An interpolating arrangement according to claim 3 wherein the rate of operation of said selector means is controlled by a circuit comprising an electric motor for driving said selector means, a tachometer coupled to said electric motor for producing an output signal indicating the speed of said motor, and a control circuit responsive to the position of said selector means and to the output signal of said tachometer supplying power to said motor.

10. An interpolating arrangement according to claim 9 wherein said control circuit comprises means for multiplying the output signal from said tachometer by a linear function of the position of said selector means, means for comparing the output of said multiplying means with a reference signal, and an amplifier for amplifying the output of said comparing means to supply power to said motor.

References Cited by the Examiner

UNITED STATES PATENTS

| | | | |
|---|---|---|---|
| 2,833,110 | 4/59 | Spencer et al. | 235—189 |
| 2,928,604 | 3/60 | Dudman et al. | 235—197 |
| 2,929,555 | 3/60 | Spencer et al. | 235—151 |
| 2,944,737 | 7/60 | Cail et al. | 235—151 |
| 2,949,232 | 8/60 | Spencer | 253—183 |
| 2,950,864 | 8/60 | Spencer | 235—197 |
| 2,961,161 | 11/60 | Spencer et al. | 235—197 |
| 3,003,699 | 10/61 | Cail et al. | 235—197 |
| 3,009,642 | 11/61 | Spencer | 235—197 |
| 3,010,656 | 11/61 | Spencer | 235—197 |
| 3,021,075 | 2/62 | Spencer | 235—197 |
| 3,022,953 | 2/62 | Udall | 235—197 |

MALCOLM A. MORRISON, *Primary Examiner.*

WALTER W. BURNS, JR., *Examiner.*